(12) United States Patent
Choi et al.

(10) Patent No.: US 12,002,974 B2
(45) Date of Patent: Jun. 4, 2024

(54) POUCH TYPE SECONDARY BATTERY

(71) Applicant: LG Chem, Ltd., Seoul (KR)

(72) Inventors: Yong Su Choi, Daejeon (KR); Sang Hun Kim, Daejeon (KR); Min Hyeong Kang, Daejeon (KR); Hyung Kyun Yu, Daejeon (KR); Soo Ji Hwang, Daejeon (KR); Na Yoon Kim, Daejeon (KR); Yong Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 16/621,814

(22) PCT Filed: Nov. 6, 2018

(86) PCT No.: PCT/KR2018/013359
§ 371 (c)(1),
(2) Date: Dec. 12, 2019

(87) PCT Pub. No.: WO2019/103357
PCT Pub. Date: May 31, 2019

(65) Prior Publication Data
US 2020/0127246 A1    Apr. 23, 2020

(30) Foreign Application Priority Data
Nov. 23, 2017    (KR) .......................... 10-2017-0157526

(51) Int. Cl.
*B60T 8/18*    (2006.01)
*B65G 65/23*    (2006.01)
(Continued)

(52) U.S. Cl.
CPC ....... *H01M 50/178* (2021.01); *H01M 50/105* (2021.01); *H01M 50/553* (2021.01);
(Continued)

(58) Field of Classification Search
CPC ............. H01M 50/555; H01M 50/553; H01M 50/578; H01M 50/105; H01M 50/136;
(Continued)

(56) References Cited

U.S. PATENT DOCUMENTS 10,276,902 B2    4/2019    Park et al.
10,529,959 B2    1/2020    Lee et al.
(Continued)

FOREIGN PATENT DOCUMENTS

CN    101032043 A    9/2007
CN    102055038 A    5/2011
(Continued)

OTHER PUBLICATIONS

Choi et al; "KR20130042954A Secondary Battery Having Improved Safety Characteristics and Manufacturing Method Thereof"; Espacenet Machine Translation (Year: 2013).*
(Continued)

*Primary Examiner* — Dustin Q Dam
*Assistant Examiner* — Charlene Bermudez
(74) *Attorney, Agent, or Firm* — Lerner David LLP

(57) ABSTRACT

A pouch type secondary battery according to the present invention includes: an electrode assembly; a battery case accommodating the electrode assembly in an inside thereof; an electrode tab protruding from the electrode assembly; a first electrode lead having an inner end connected to the electrode tab; a second electrode lead having an inner end coupled to an outer end of the first electrode lead and an outer end extending outside of the battery case; a connection part coupling the first and second electrode leads to each other; an insulation part fused around a portion of each of the first and second electrode leads, the insulation part bonding the first and second electrode leads to the battery case; and a fusion prevention part located at a position at one surface
(Continued)

of the first electrode lead, the fusion prevention part preventing the first electrode lead from being fused to the insulation part.

15 Claims, 10 Drawing Sheets

(51) Int. Cl.
| | |
|---|---|
| *G07F 7/06* | (2006.01) |
| *H01M 50/105* | (2021.01) |
| *H01M 50/178* | (2021.01) |
| *H01M 50/553* | (2021.01) |
| *H01M 50/119* | (2021.01) |
| *H01M 50/121* | (2021.01) |
| *H01M 50/129* | (2021.01) |
| *H01M 50/534* | (2021.01) |
| *H01M 50/536* | (2021.01) |
| *H01M 50/55* | (2021.01) |
| *H01M 50/557* | (2021.01) |

(52) U.S. Cl.
CPC ........ *H01M 50/119* (2021.01); *H01M 50/121* (2021.01); *H01M 50/129* (2021.01); *H01M 50/534* (2021.01); *H01M 50/536* (2021.01); *H01M 50/55* (2021.01); *H01M 50/557* (2021.01)

(58) Field of Classification Search
CPC .. H01M 50/178; H01M 50/186; H01M 50/30; H01M 50/308; H01M 50/317; H01M 50/342; H01M 50/3425; H01M 50/474; H01M 50/531; H01M 50/533; H01M 50/536; H01M 50/569; H01M 10/04; H01M 50/33; H01M 50/36; H01M 50/131; H01M 50/46; H01M 50/461; H01M 50/471; H01M 50/48; H01M 50/489; H01M 2200/20
See application file for complete search history.

(56) References Cited

U.S. PATENT DOCUMENTS

| | | | | |
|---|---|---|---|---|
| 2003/0134193 | A1 | 7/2003 | Hanafusa et al. | |
| 2008/0254360 | A1* | 10/2008 | Miyazawa | H01M 50/543 |
| | | | | 429/184 |
| 2008/0311469 | A1* | 12/2008 | Kim | H01M 50/172 |
| | | | | 429/185 |
| 2011/0086264 | A1* | 4/2011 | Tsukamoto | H01M 50/543 |
| | | | | 429/184 |
| 2011/0104520 | A1 | 5/2011 | Ahn | |
| 2011/0311862 | A1 | 12/2011 | Ahn | |
| 2012/0064381 | A1* | 3/2012 | Yageta | H01M 50/121 |
| | | | | 429/82 |
| 2012/0107573 | A1* | 5/2012 | Iwata | C09J 7/381 |
| | | | | 428/189 |
| 2013/0143077 | A1 | 6/2013 | Yebka et al. | |
| 2013/0337300 | A1 | 12/2013 | Saito | |
| 2016/0028068 | A1 | 1/2016 | Yang et al. | |
| 2017/0110711 | A1 | 4/2017 | Ahn et al. | |
| 2017/0110712 | A1 | 4/2017 | Ahn et al. | |
| 2017/0125786 | A1 | 5/2017 | Park et al. | |
| 2018/0053976 | A1* | 2/2018 | Park | H01M 10/647 |
| 2018/0269435 | A1 | 9/2018 | Lee et al. | |
| 2019/0207196 | A1* | 7/2019 | Park | H01M 50/531 |

FOREIGN PATENT DOCUMENTS

| | | | | |
|---|---|---|---|---|
| CN | 102290536 | A | 12/2011 | |
| CN | 105027326 | A | 11/2015 | |
| CN | 106601976 | A | 4/2017 | |
| CN | 106654137 | A | 5/2017 | |
| CN | 106941148 | A | 7/2017 | |
| EP | 2950371 | A1 | 12/2015 | |
| EP | 3267512 | A1 | 1/2018 | |
| JP | 2000067846 | A | 3/2000 | |
| JP | 2011082394 | A | 4/2011 | |
| JP | 2012209204 | A | 10/2012 | |
| JP | 2016532991 | A | 10/2016 | |
| JP | 2018513524 | A | 5/2018 | |
| KR | 20130014253 | A | 2/2013 | |
| KR | 20130042954 | A * | 4/2013 | |
| KR | 2014069900 | A * | 6/2014 | |
| KR | 20140139793 | A | 12/2014 | |
| KR | 20160125920 | A | 11/2016 | |
| KR | 20160125920 | A * | 11/2016 | H01M 10/647 |
| KR | 20170025872 | A | 3/2017 | |
| KR | 101734703 | B1 | 5/2017 | |
| KR | 20170111994 | A | 10/2017 | |
| TW | 200301976 | A | 7/2003 | |
| WO | WO-0241437 | A1 * | 5/2002 | H01M 10/052 |
| WO | 2016171517 | A1 | 10/2016 | |
| WO | 2017171353 | A1 | 10/2017 | |
| WO | 2017188605 | A1 | 11/2017 | |
| WO | WO-2018199511 | A1 * | 11/2018 | H01M 10/0413 |

OTHER PUBLICATIONS

Yang Jeong-hoon; Choi, Seung-Don; "KR20130042954A Secondary Battery Having Improved Safety Characteristics and Manufacturing Method Thereof", Machine translation of KR 2013/0042954 A obtained by ESpacenet Patent Translate (Year: 2013).*
Cho; "KR20140069900A Adhesive Tape for Connecting the Secondary Battery Electrode"; Machine Translation of KR-2014069900-A obtained from Espacenet (Year: 2014).*
International Search Report for Application No. PCT/KR2018/013359, dated Apr. 8, 2019, pp. 1-2.
Extended European Search Report including Written Opinion for Application No. EP18882158.1 dated Jun. 17, 2020, 9 pgs.
Examination Report from the Office Action for Indian Application No. 202017000234 dated Mar. 22, 2022, 2 pages.
Search Report dated Apr. 20, 2022 from the Office Action for Chinese Application No. 201880040740.4 dated Apr. 27, 2022, 2 pages.
Wang, J. "Packaging Materials Science," China Light Industry Press, Jan. 31, 2009, pp. 257-262.
Search Report for Chinese Application No. 201880040740.4 dated Oct. 28, 2021. 4 pgs.

* cited by examiner

POUCH TYPE SECONDARY BATTERY

CROSS-REFERENCE TO RELATED APPLICATION

The present application is a national phase entry under 35 U.S.C. § 371 of International Patent Application No. PCT/KR2018/013359, filed on Nov. 6, 2018, published in Korean, which claims priority from Korean Patent Application No. 10-2017-0157526, filed on Nov. 23, 2017, the disclosures of which are hereby incorporated by reference in their entireties.

TECHNICAL FIELD

The present invention relates to a pouch type secondary battery, and more particularly, to a pouch type secondary battery in which an internal pressure of a battery case, in which two-stage electrode leads are detached from each other, is easily controlled by a user, and when the internal pressure is controlled, the controlled internal pressure is constantly maintained.

BACKGROUND ART

Batteries (cells) that generate electric energy through physical or chemical reaction to supply the generated electric energy to the outside are used when AC power to be supplied to the building is not obtained, or DC power is required according to the living environments surrounded by various electronic devices.

Among such batteries, primary batteries and secondary batteries, which are chemical cells using chemical reaction, are generally used. The primary batteries are consumable cells which are collectively referred to as dry cells. On the other hand, a secondary battery is a rechargeable battery that is manufactured by using a material in which oxidation and reduction processes between current and a material are capable of being repeated many times. In general, secondary batteries include nickel-cadmium batteries, nickel-hydrogen batteries, lithium ion batteries, and lithium ion polymer batteries. Such a secondary battery is being applied to and used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

A lithium secondary battery is generally formed by laminating a positive electrode (i.e., cathode), a separator, and a negative electrode (i.e., anode). Also, materials of the positive electrode, the separator, and the negative electrode may be selected in consideration of battery lifespan, charging/discharging capacities, temperature characteristics, stability, and the like. The charging and discharging of the lithium secondary battery are performed while lithium ions are intercalated and deintercalated from lithium metal oxide of the positive electrode to a graphite electrode of the negative electrode.

In general, unit cells, each of which has a three-layered structure of a positive electrode/a separator/a negative electrode or a five-layered structure of a positive electrode/a separator/a negative electrode/a separator/a positive electrode or a negative electrode/a separator/a positive electrode/a separator/a negative electrode, are assembled to constitute one electrode assembly. The electrode assembly is accommodated in a specific case.

Such a secondary battery is classified into a pouch type secondary battery and a can type secondary battery according to a material of a case accommodating the electrode assembly. In the pouch type secondary battery, an electrode assembly is accommodated in a pouch made of a flexible polymer material having a variable shape. Also, in the can type secondary battery, an electrode assembly is accommodated in a case made of a metal or plastic material having a predetermined shape.

The secondary battery may be deteriorated in safety due to various problems such as internal short circuit due to an external impact, heat generation due to overcharging and overdischarging, electrolyte decomposition due to the generated heat, and a thermal runaway phenomenon. Particularly, explosion of the secondary battery is caused by various causes. For example, an increase in gas pressure within the secondary battery due to the decomposition of the electrolyte may also act as one cause.

Particularly, when the secondary battery is repeatedly charged and discharged, a gas is generated by electrochemical reaction between the electrolyte and an electrode active material. Here, the generated gas may allow the secondary battery to increase in internal pressure to cause problems such as weakening of bonding force between components, damage of a case of the secondary battery, an early operation of a protection circuit, deformation of an electrode, internal short circuit, explosion, and the like. Thus, in the case of the can type secondary battery, a protection member such as a CID filter and a safety vent is provided to physically interrupt an electrical connection when an internal pressure of a case increases. However, in the case of the pouch type secondary battery according to the related art, the protection member is not sufficiently provided.

In recent years, in the pouch type secondary battery, a plurality of electrode leads are formed in two stages, and thus, technologies for physically interrupting electrical connection such as interruption of electrical connection by detaching the plurality of electrode leads from each other when the case is expanded have been proposed. However, according to the related art, a pressure within the battery case in which the plurality of electrode leads are detached from each other is not controlled. That is, even though internal pressures of the secondary batteries of the same model increase equally, the internal pressure at which current is interrupted is not constant, and it is difficult to control the internal pressure by the user. Therefore, there has been a problem in that reliability of safety may not be always secured.

DISCLOSURE OF THE INVENTION

Technical Problem

An object to be solved by the present invention is to provide a pouch type secondary battery in which an internal pressure of a battery case, in which two-stage electrode leads are detached from each other, is easily controlled by a user, and when the internal pressure is controlled, the controlled internal pressure is constantly maintained.

The objects of the present invention are not limited to the aforementioned object, but other objects not described herein will be clearly understood by those skilled in the art from descriptions below.

Technical Solution

To solve the above problem, a pouch type secondary battery includes: an electrode assembly in which a positive electrode and a negative electrode and a separator are alternately laminated; a battery case accommodating the electrode assembly in an inside thereof; an electrode tab connected to the electrode assembly and protruding from one side of the electrode assembly; a first electrode lead having an inner end electrically connected to the electrode tab; a second electrode lead having an inner end mechanically and electrically coupled to an outer end of the first electrode lead and an outer end extending from the inside to an outside of the battery case; a connection part mechanically and electrically coupling the first and second electrode leads to each other; an insulation part fused around a portion of each of the first and second electrode leads, the insulation part bonding the first and second electrode leads to the battery case; and a fusion prevention part located at a position at one surface of the first electrode lead, the fusion prevention part preventing the first electrode lead from being fused to the insulation part.

Also, the fusion prevention part may be located between the connection part and the inside of the battery case.

Also, the fusion prevention part may be an abraded portion of the one surface of the first electrode lead.

Also, the fusion prevention part may be a non-surface-treated portion of the one surface of the first electrode lead.

Also, a remaining portion of the one surface of the first electrode lead may be surface-treated.

Also, the insulation part may include an acid-treated polyolefin-based resin.

Also, the polyolefin-based resin may include polypropylene.

Also, the fusion prevention part may be a tape attached to the position at the one surface of the first electrode lead.

Also, the tape may include normal polypropylene that is not acid-treated.

Also, the fusion prevention part may be a film to attached to the insulation part, the film contacting the position at the one surface of the first electrode lead.

Also, the film may include normal polypropylene that is not acid-treated.

Also, a bonding force between the fusion prevention part and a confronting surface of the first electrode lead or the insulation part may be less than a bonding force between the first or second electrode lead and the connection part.

Also, the connection part may be made of a conductive polymer including an electrically conductive material.

Also, the connection part may have a thickness of 1 μm to 500 μm.

Also, the insulation part may surround a location at which the first and second electrode leads are connected to each other by the connection part.

Particularities of other embodiments are included in the detailed description and drawings.

Advantageous Effects

The embodiments of the present invention may have at least the following effects.

The fusion prevention part may be formed at the specific position on one surface of the first electrode lead, and the length of the fusion prevention part may be adjusted to control the internal pressure of the battery case, in which the first and second electrode leads are detached from each other. Thus, when internal pressure is controlled, the controlled internal pressure may be constantly maintained.

The effects of the prevent invention are not limited by the aforementioned description, and thus, more varied effects are involved in this specification.

MODE FOR CARRYING OUT THE INVENTION

Figure 1:
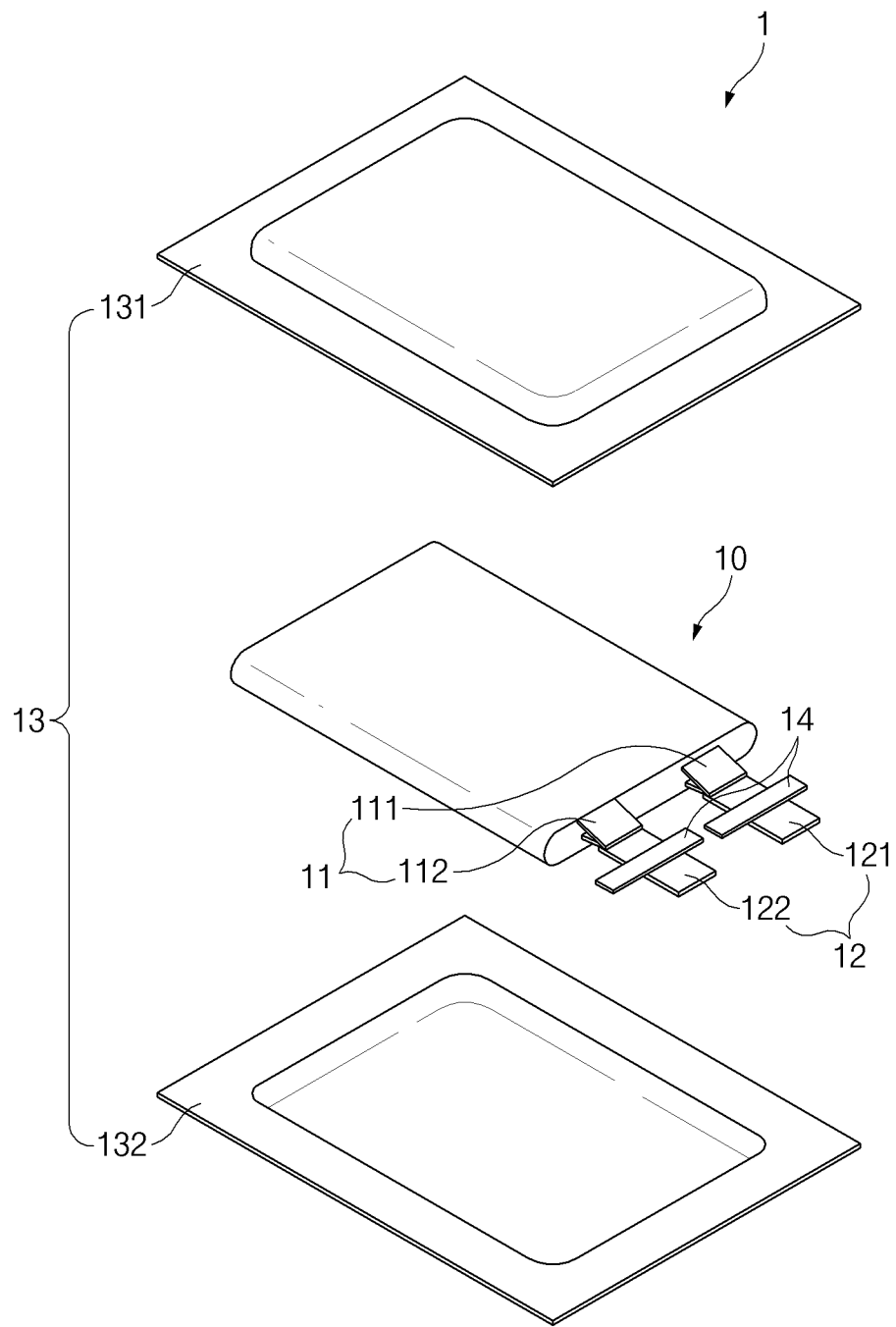
FIG. 1 is an assembled view of a pouch type secondary battery according to an embodiment of the present invention.

Advantages and features of the present disclosure, and implementation methods thereof will be clarified through following embodiments described with reference to the accompanying drawings. The present invention may, however be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the inventive concept. In this specification, the terms of a singular form may comprise plural forms unless specifically mentioned. The meaning of "comprises" and/or "comprising" does not exclude other components besides a mentioned component.

Hereinafter, preferred embodiments will be described in detail with reference to the accompanying drawings.

Figure 2:
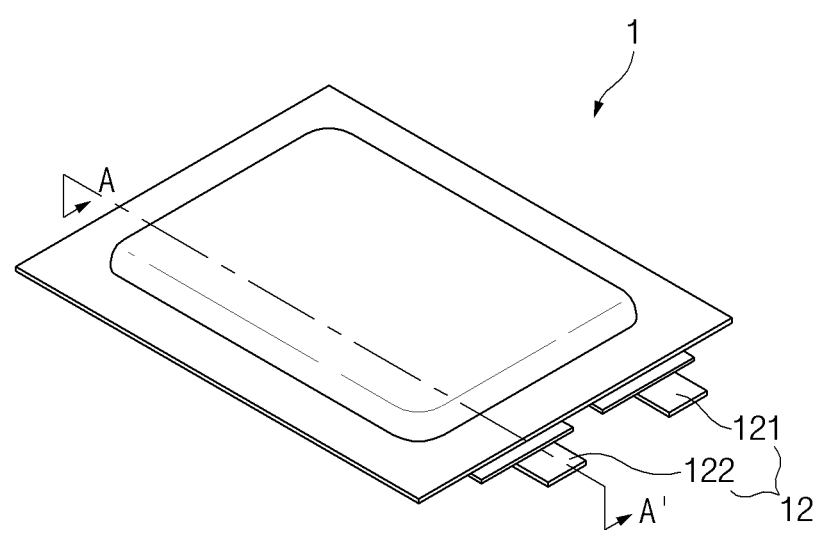
FIG. 2 is a perspective view illustrating a state in which the pouch type secondary battery is completely assembled.

FIG. 1 is an assembled view of a pouch type secondary battery 1 according to an embodiment of the present invention, and FIG. 2 is a perspective view illustrating a state in which the pouch type secondary battery 1 is completely assembled.

In general, in a process of manufacturing a lithium secondary battery, first, slurry in which an electrode active material, a binder, and a plasticizer are mixed with each other is applied to a positive current collector and a negative current collector to manufacture a positive electrode plate and a negative electrode plate. Thereafter, the negative current collector, the positive electrode plate, and a separator are alternately laminated to form an electrode assembly 10 having a predetermined shape, and then, the electrode assembly is inserted into a battery case 13, an electrolyte is injected, and a sealing process is performed.

As illustrated in FIG. 1, the electrode assembly 10 includes an electrode tab 11. The electrode tab 11 is connected to each of a positive electrode and a negative electrode of the electrode assembly 10 to protrude to the outside of the electrode assembly 10, thereby providing a path, through which electrons moves, between the inside and outside of the electrode assembly 10. A collector of the electrode assembly 10 is constituted by a portion coated with an electrode active material and a distal end, on which the electrode active material is not applied, i.e., a non-coating portion. Also, the electrode tab 111 may be formed by cutting the non-coating portion or by connecting a separate conductive member to the non-coating portion through ultrasonic welding. As illustrated in FIG. 1, the electrode tabs 11 may protrude from one side of the electrode assembly 10 in the same direction, but the present invention is not limited thereto. For example, the electrode tabs 11 may protrude in directions different from each other.

In the electrode assembly 10, the electrode lead 12 is connected to the electrode tab 11 through spot welding. The electrode lead 12 according to an embodiment of the present invention is provided in plurality. Also, in the plurality of electrode leads 12, a first electrode lead (see reference numeral 1230 of FIG. 5) is connected to the electrode tab 11 of the electrode assembly 10, and a second electrode lead (see reference numeral 1240 of FIG. 5) protrudes to the outside of a battery case 13. The first and second electrode leads 1230 and 1240 will be described below in detail. Also, a portion of the electrode lead 12 is surrounded by an insulation part 14. The insulation part 14 may be disposed to be limited within a sealing part, at which an upper pouch 131 and a lower pouch 132 are thermally fused, so as to be bonded to the battery case 13. Also, electricity generated from the electrode assembly 10 may be prevented from flowing to the battery case 13 through the electrode lead 12, and the sealing of the battery case 13 may be maintained. Thus, the insulation part 14 may be made of a nonconductor having non-conductivity, which is not electrically conductive. In general, although an insulation tape which is easily attached to the electrode lead 12 and has a relatively thin thickness is mainly used as the insulation part 14, the present invention is not limited thereto. For example, various members may be used as the insulation part 14 as long as the members are capable of insulating the electrode lead 12.

The electrode lead 12 may extend in the same direction or extend in directions different from each other according to the formation positions of the positive electrode tab 111 and the negative electrode tab 112. The positive electrode lead 121 and the negative electrode lead 122 may be made of materials different from each other. That is, the positive electrode lead 121 may be made of the same material as the positive current collector, i.e., an aluminum (Al) material, and the negative electrode lead 122 may be made of the same material as the negative current collector, i.e., a copper (Cu) material or a copper material coated with nickel (Ni). Also, a portion of the electrode lead 12, which protrudes to the outside of the battery case 13, may be provided as a terminal part and electrically connected to an external terminal.

In the pouch type secondary battery 1, the battery case 13 may be a pouch made of a flexible material. Hereinafter, the case in which the battery case 13 is the pouch will be described. Also, the battery case 13 accommodates the electrode assembly 10 so that a portion of the electrode lead 12, i.e., the terminal part is exposed and then is sealed. As illustrated in FIG. 1, the battery case 13 includes the upper pouch 131 and the lower pouch 132. An accommodation space 1331 in which the electrode assembly 10 is accommodated may be provided in the lower pouch 132, and upper pouch 131 may cover an upper side of the accommodation space 1331 so that the electrode assembly 10 is not separated to the outside of the battery case 13. Here, as illustrated in FIG. 1, the accommodation space 1331 may also be provided in the upper pouch 131 to accommodate the electrode assembly 10 through an upper side of the upper pouch 131.

As illustrated in FIG. 1, the upper pouch 131 and the lower pouch 132 may be separately provided, but the present invention is not limited thereto. For example, the upper pouch 131 and the lower pouch 132 may be manufactured through various manners, that is, one side of the upper pouch 131 and one side of the lower pouch 132 may be connected to each other.

When the electrode lead 12 is connected to the electrode tab 11 of the electrode assembly 10, and the insulation part 14 is provided on a portion of the electrode lead 12, the electrode assembly 10 may be accommodated in the accommodation space 1331 provided in the lower pouch 132, and the upper pouch 131 may cover the upper side of the accommodation space 1331. Also, when the electrolyte is injected, and the sealing part provided on an edge of each of the upper pouch 131 and the lower pouch 132 is sealed to manufacture the secondary battery 1 as illustrated in FIG. 2.

Figure 3:
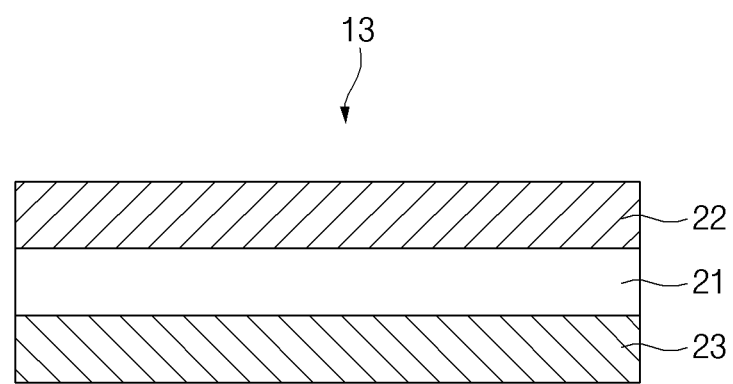
FIG. 3 is a cross-sectional view of a battery case according to an embodiment of the present invention.

FIG. 3 is a cross-sectional view of the battery case 13 according to an embodiment of the present invention.

The battery case 13 according to an embodiment of the present invention may be a pouch may a pouch made of a flexible material. In general, as illustrated in FIG. 3, the battery case 13 accommodating the electrode assembly 10 includes a gas barrier layer 21, a surface protection layer 22, and a sealant layer 23. The gas barrier layer 21 blocks introduction and discharge of a gas and includes a metal. Thus, aluminum (Al) foil is mainly used as the gas barrier layer. A surface protection layer 22 is disposed on the outermost layer and thus frequently cause friction and collision with the outside. Thus, a polymer such as a nylon resin, PET, or the like having abrasion resistance and heat resistance is mainly used for the surface protection layer 22. Also, the sealant layer 23 is disposed on the innermost layer and directly contacts the electrode assembly 10. Thus, a polymer such as polypropylene (PP) or the like is mainly used for the sealant layer.

The pouch type battery case 13 may be manufactured by processing a film having the above-described lamination structure into the form of a bag. Thus, when the electrode assembly 10 is accommodated in the pouch type battery case 13, the electrolyte is injected. Thereafter, when the upper pouch 131 and the lower pouch 132 may contact each other, and thermal compression is applied to the sealing part, the sealant layers may be bonded to each other to seal the battery case 13. Here, since the sealant layer 23 directly contacts the electrode assembly 10, the sealant layer 23 may have to have insulating properties. Also, since the sealant layer 23 contacts the electrolyte, the sealant layer 23 may have to have corrosion resistance. Also, since the inside of the battery case 13 is completely sealed to prevent materials from moving between the inside and outside of the battery case 13, high sealability has to be realized. That is, the sealing part on which the sealant layers 23 are bonded to each other has to have superior thermal bonding strength. In general, a polyolefin-based resin such as polypropylene (PP) or polyethylene (PE) may be used for the sealant layer 23. Particularly, polypropylene (PP) is excellent in mechanical properties such as tensile strength, rigidity, surface hardness, abrasion resistance (23) heat resistance and chemical properties such as corrosion resistance and thus is mainly used for manufacturing the sealant layer 23.

Figure 4:
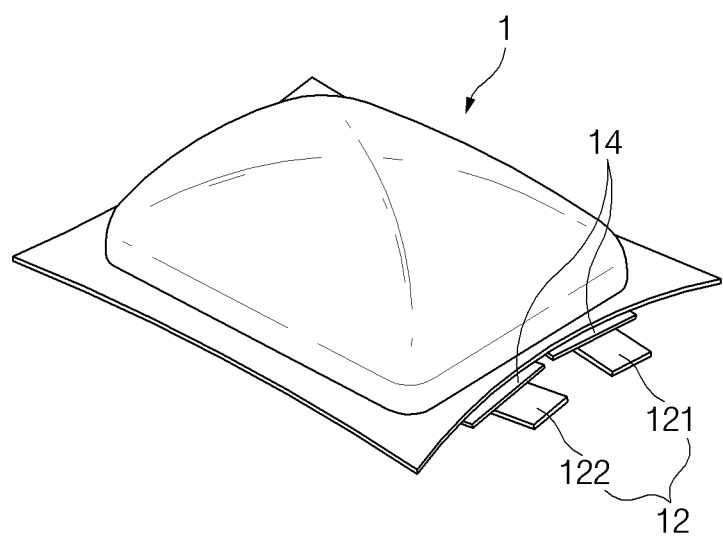
FIG. 4 is a perspective view illustrating a state in which the pouch type secondary battery is expanded in volume according to an embodiment of the present invention.

FIG. 4 is a perspective view illustrating a state in which the pouch type secondary battery 1 is expanded in volume according to an embodiment of the present invention.

Generally, in the electrode assembly 10, the charging and discharging are performed by oxidation and reduction reactions. Thus, when the secondary battery 1 is repeatedly charged and discharged, a gas may be generated somewhat by an electrochemical reaction between the electrolyte and the electrode active material. Furthermore, the more gas may be abnormally generated by overcharging or short-circuiting due to an abnormal reaction in the electrode assembly 10. However, since each of the layers is made of flexible material in the pouch type battery case 13, the internal pressure of the secondary battery 1 increases by the generated gas to expand a volume of the pouch type secondary battery 1 as illustrated in FIG. 4.

Figure 5:
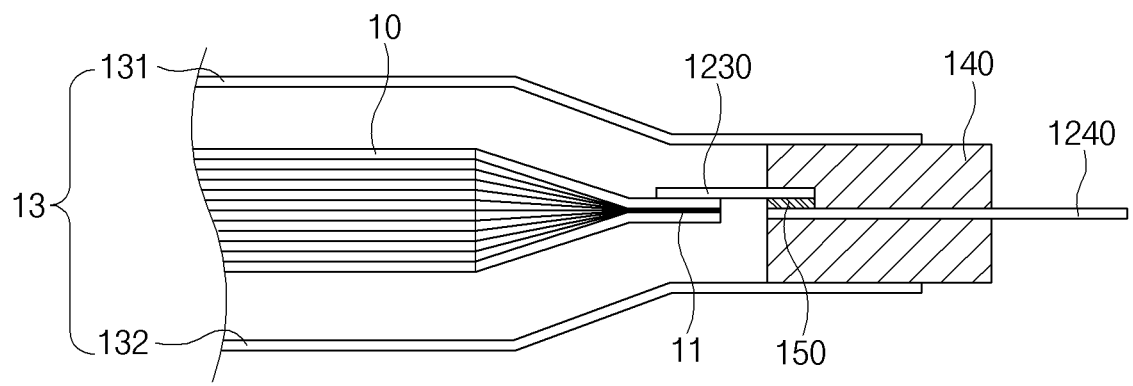
FIG. 5 is a partial cross-sectional view taken along line A-A' of FIG. 2 in a pouch type secondary battery including a plurality of electrode leads according to a related art.

FIG. 5 is a partial cross-sectional view taken along line A-A' of FIG. 2 in a pouch type secondary battery including a plurality of electrode leads according to a related art.

As described above, when a gas is generated in a battery case 13, an internal pressure of a secondary battery 1 may increase to cause weakening of bonding force between components, damage of the case of the secondary battery 1, an early operation of a protection circuit, deformation of an electrode, internal short circuit, explosion, and the like. To solve this problem, in the pouch type secondary battery 1, a plurality of electrode leads 1230 and 1240 are formed in two stages, and when the battery case 13 is expanded, the plurality of electrode leads 1230 and 1240 may be detached from each other to physically interrupt the electrical connection. Here, the detachment may mean that adsorbed or attached portions are separated from each other.

Particularly, as illustrated in FIG. 5, the secondary battery includes a plurality of electrode leads 12, i.e., a first electrode lead 1230 and a second electrode lead 1240. Also, one surface of the other end of the first electrode lead 1230 and one surface of one end of the second electrode lead 1240 may be bonded to each other through a connection part 15 and thus be connected to each other. Here, it is preferable that the first and second electrode leads 1230 and 1240 are disposed on different planes so that top and bottom surfaces thereof are connected to each other.

Figure 6:
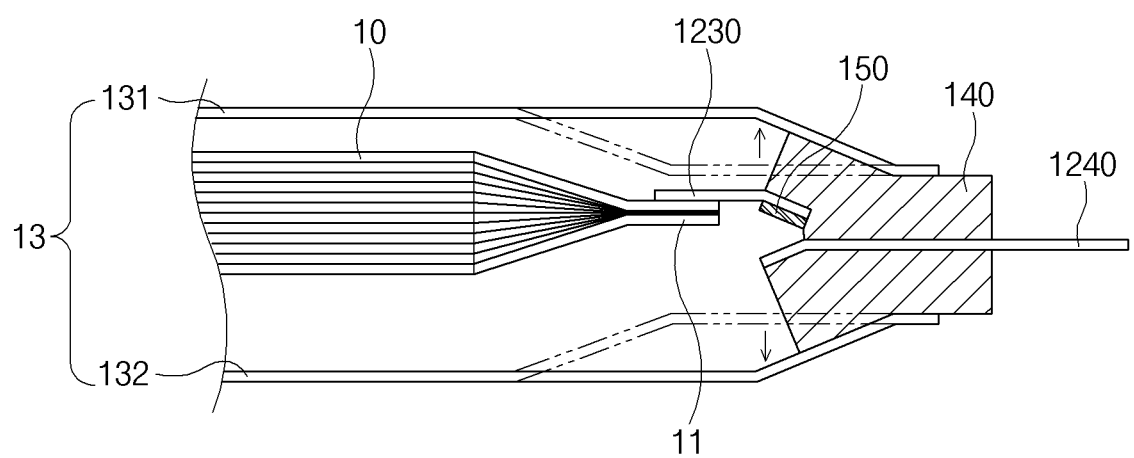
FIG. 6 is a partial cross-sectional view taken along line A-A' of FIG. 2 when the pouch type secondary battery including the plurality of electrode leads according to the related art is expanded in volume.

FIG. 6 is a partial cross-sectional view taken along line A-A' of FIG. 2 when the pouch type secondary battery including the plurality of electrode leads according to the related art is expanded in volume.

When a gas is generated in the battery case 13 to expand a volume of the secondary battery 1, repulsive force applied to the first electrode lead 1230 and the second electrode lead 1240 increases. Also, as illustrated in FIG. 6, the first and second electrode leads 1230 and 1240 are eventually detached from each other. Thus, the electrical connection may be interrupted so that the electricity does not flow ever.

However, according to the related art, the internal pressure of the battery case in which the plurality of electrode leads 1230 and 1240 are detached from each other may not be constant. Particularly, if the secondary batteries having the same model are provided, all of specifications of the battery cases 13 and specifications and positions of the first and second electrode leads 1230 and 1240 may be the same. However, when a sealing process is performed, an insulation part 14 surrounding the first and second electrode leads 1230 and 1240 may have a film shape made of a flexible material. However, when the first and second electrode leads 1230 and 1240 are detached from each other, the insulation part 14 attached to the first electrode lead 1230 may also be detached. Here, it is difficult to constantly maintain a length of the insulation part having the film shape, which is attached to the first electrode lead 1230. That is, bonding force between the insulation part 14 and the first electrode lead 1230 is not constant. Thus, the internal pressure at which current is interrupted is not constant, and it is difficult to control the internal pressure by the user. Therefore, there has been a problem in that reliability of safety may not be always secured.

Figure 7:
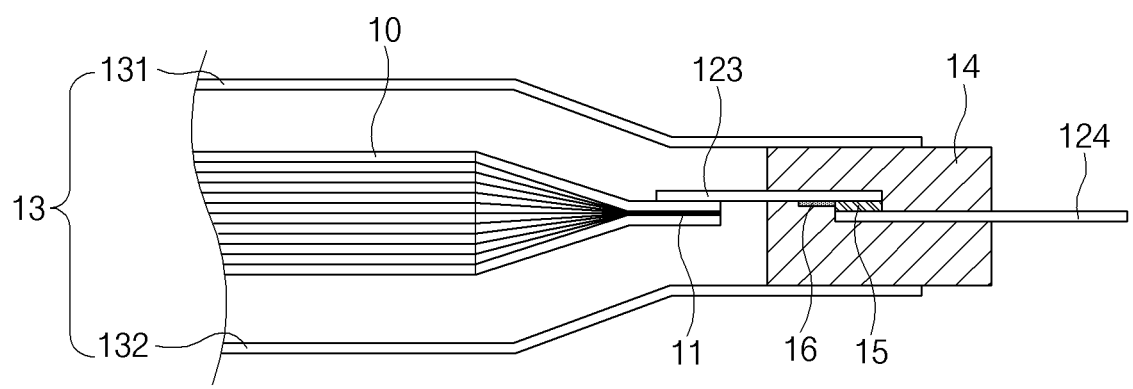
FIG. 7 is a partial cross-sectional view taken along line A-A' of FIG. 2 in the pouch type secondary battery according to an embodiment of the present invention.

FIG. 7 is a partial cross-sectional view taken along line A-A' of FIG. 2 in the pouch type secondary battery according to an embodiment of the present invention.

As illustrated in FIG. 7, the pouch type secondary battery 1 according to an embodiment of the prevent invention includes a plurality of electrode leads 12, i.e., a first electrode lead 123 connected to the electrode tab 11 of the electrode assembly and a second electrode lead 124 protruding to the outside of the battery case 13. Here, the first electrode lead 123 has one end connected to the electrode tab 11 and the other end connected to the second electrode lead 124. Also, the second electrode lead 124 has one end connected to the outer end of the first electrode lead 123 and the other end protruding to the outside of the battery case 13. Also, one surface of the other end of the first electrode lead 123 and one surface of one end of the second electrode lead 124 may adhere to each other through a connection part 15 and thus be connected to each other.

When the battery case 13 is normal, the first and second electrode leads 123 and 124 have to be stably connected to each other. When the secondary battery 13 is expanded, the first and second electrode leads 123 and 124 have to be easily detached from each other. Thus, it is preferable that the first and second electrode leads 123 and 124 are disposed on different planes so that upper and lower surfaces thereof are connected to each other instead that the first and second electrode leads 123 and 124 are disposed on the same plane so that side surfaces thereof are connected to each other.

The connection part 15 connecting the first and second electrode leads 123 and 124 to each other may have a thin film shape having conductivity. Particularly, it is preferable that the connection part 15 has a very thin thickness of 1 μm to 500 μm. Thus, even though the first and second electrode leads 123 and 124 form a stepped portion therebetween, a size of the stepped portion may not be excessively large, and the electricity generated from the electrode assembly 10 may be easily discharged to the outside. For this, the connection part 15 may be made of a polymer that is a conductive material.

The conductive material may include at least one of: natural or artificial graphite; carbon black such as carbon black, acetylene black, Ketjen black, channel black, furnace black, lamp black, and summer black; conductive fiber such as carbon fiber or metal fiber; metal powders such as carbon fluoride, aluminum, nickel, gold, silver, and copper powder; powder having a core/shell structure coated with a different kind of metal on one kind of metal; conductive whisker such as zinc oxide and potassium titanate; conductive metal oxide such as titanium oxide; and conductive materials such as polyphenylene derivatives.

The polymer may include at least one of an acrylic resin, an epoxy resin, an ethylene propylene diene monomer (EPDM) resin, a chlorinated polyethylene (CPE) resin, silicone, polyurethane, an urea resin, a melamine resin, a phenol resin, an unsaturated ester resin, polypropylene (PP), polyethylene (PE), polyimide, and polyamide, and most preferably, an acrylic resin.

As described above, a portion of the electrode lead 12 is surrounded by the insulation part 14. Also, the electrode lead is bonded to the battery case through the insulation part 14. In a process of sealing the upper pouch 131 and the lower pouch 132, a relatively high pressure may be applied to a portion contacting the electrode lead 12 to damage the sealant layer 23 of the battery case 13. Since the sealant layer 23 directly contacts the electrode assembly 10 as described above, the sealant layer 23 may have insulating properties. However, if the sealant layer 23 is damaged, the electricity may flows to the battery case 13 through the electrode lead 12. Particularly, since the gas barrier layer 21 of the battery case 13 is made of a metal such as aluminum, if the sealant layer 23 is partially damaged to expose the gas barrier layer, the electricity may easily flow due to the contact with the electrode lead 12.

Thus, the insulation part 14 may be made of a nonconductor having non-conductivity, which is not electrically conductive. Also, the insulation part 14 has high mechanical strength and heat resistance. Thus, the insulation part 14 may include, for example, a polyolefin-based resin such as polypropylene (PP) or polyethylene (PE). Particularly, polypropylene (PP) is excellent in mechanical properties such as tensile strength, rigidity, surface hardness, abrasion resistance, heat resistance, and the like, and chemical properties such as corrosion resistance and the like and thus is mainly used for manufacturing the insulation part 14. Furthermore, acid-treated polypropylene may be provided to improve bonding force of the insulation part 14. For example, the acid-treated polypropylene and normal polypropylene may be mixed with each other, polypropylene may be further mixed, or only the acid-treated polypropylene may be provided simply. Here, the acid-treated polypropylene may be maleic anhydride polypropylene (MAH PP).

Thus, when the upper pouch 131 and the lower pouch 132 are thermally fused, the insulation part 14 may be maintained in shape to prevent the electrode lead 12 and the gas barrier layer 21 from contacting each other even through a portion of the sealant layer is damaged. Thus, the electricity generated from the electrode assembly 10 may be prevented from flowing to the battery case 13 through the electrode lead 12. Also, the insulation part 14 has high bonding force. Thus, the insulation part 14 may be disposed to be limited within a sealing part, at which the upper pouch 131 and the lower pouch 132 are thermally fused, so that the electrode lead 12 is bonded to the battery case 13. In general, the insulating portion 14 may be made of at least one of thermoplastic, thermosetting and photocurable resins having electrical insulation properties as a polymer resin. In general, although an insulation tape which is easily attached to the electrode lead 12 and has a relatively thin thickness is mainly used as the insulation part 14, the present invention is not limited thereto. For example, various members may be used as the insulation part 14 as long as the members are capable of insulating the electrode lead 12.

As illustrated in FIG. 7, the insulation part 14 may surround all of the first electrode lead 123, the connection part 15, and the second electrode lead 124. If the first electrode lead 123 or the connection part 15 is not surrounded by the insulation part 14, repulsive force may not be applied to the first electrode lead 123 and the second electrode 124 even though the battery case 13 is expanded. The repulsive force will be described below in detail.

As illustrated in FIG. 7, the pouch type secondary battery 1 according to an embodiment of the present invention may further include a fusion prevention part 16. The fusion prevention part 16 may be disposed at a specific position on one surface of the first electrode lead to prevent the first electrode lead 123 and the insulation part 14 from being fused therebetween. The fusion prevention part 16 will be described below in detail.

Figure 8:
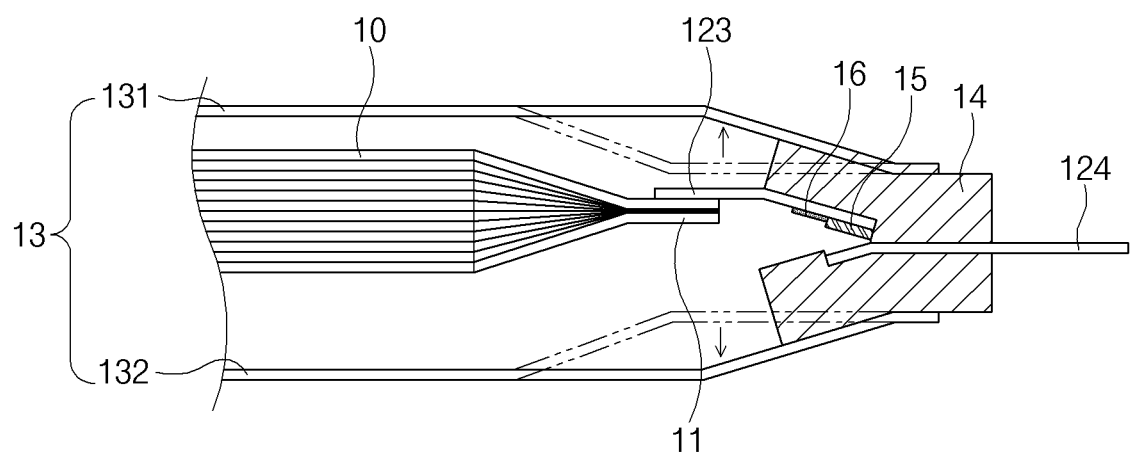
FIG. 8 is a partial cross-sectional view taken along line A-A' of FIG. 2 when the pouch type secondary battery is expanded in volume according to an embodiment of the present invention.

FIG. 8 is a partial cross-sectional view taken along line A-A' of FIG. 2 when the pouch type secondary battery 1 is expanded in volume according to an embodiment of the present invention.

As described above, when the internal pressure of the pouch type secondary battery 13 increases, the pouch type secondary battery 1 is expanded in volume. Thus, as illustrated in FIG. 8, an outer wall of the battery case 13 moves outward. Here, upper and lower walls of the outer wall of the battery case 13 may have an area greater than that of the sidewall and be not sealed, resulting in higher flexibility. Thus, the upper wall of the battery case 13 may move upward, and the lower wall of the battery case 13 may move downward.

When the secondary battery 1 is expanded in volume, as illustrated in FIG. 8, the outer wall of the battery case 13 may move outward to apply the repulsive force to the first electrode lead 123 and the second electrode 124 through the insulation part 14. Thus, as the internal pressure of the battery case 13 gradually increases, moving force of the outer wall of the battery case 13 may more increase, and the repulsive force applied to the first electrode lead 123 and the second electrode lead 124 more increase. When the bonding force between the first electrode lead 123 and the second electrode lead 124 is greater than the repulsive force, as illustrated in FIG. 8, the first electrode lead 123 and the second electrode lead 124 may be detached from each other. Thus, the electrical connection may be interrupted so that the electricity does not flow ever. However, the bonding force between the first or second electrode lead 123 or 124 and the connection part 15 may be less than that between the other surface of the first electrode lead 123 and the insulation part 14 or between the second electrode lead 124 and the insulation part 14. Thus, when the repulsive force is applied to the first electrode lead 123 and the second electrode lead 124, the bonding force between the other surface of the first electrode lead 123 or the second electrode lead 124 and the insulation part 14 may be maintained to maintain the sealing of the battery case 13, but the first and second electrode leads 123 and 124 may be detached from each other. However, the bonding force between a third position 1233 of the first electrode lead 123 and the insulation part 14 may be less than that between the first or second electrode lead 123 or 124 and the connection part 15. This will be described below in detail.

Figure 9:
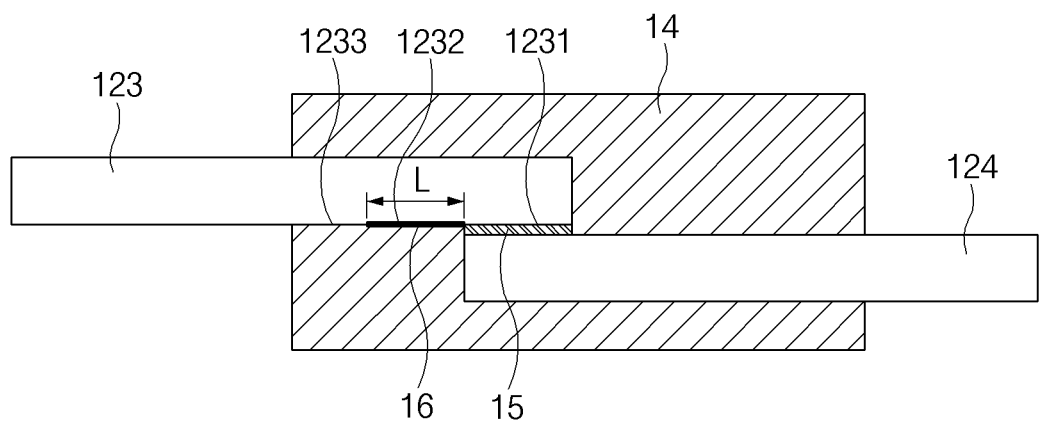
FIG. 9 is an enlarged view of a first electrode lead, a second electrode lead, and a connection part of FIG. 7 according to an embodiment of the present invention.
Figure 10:
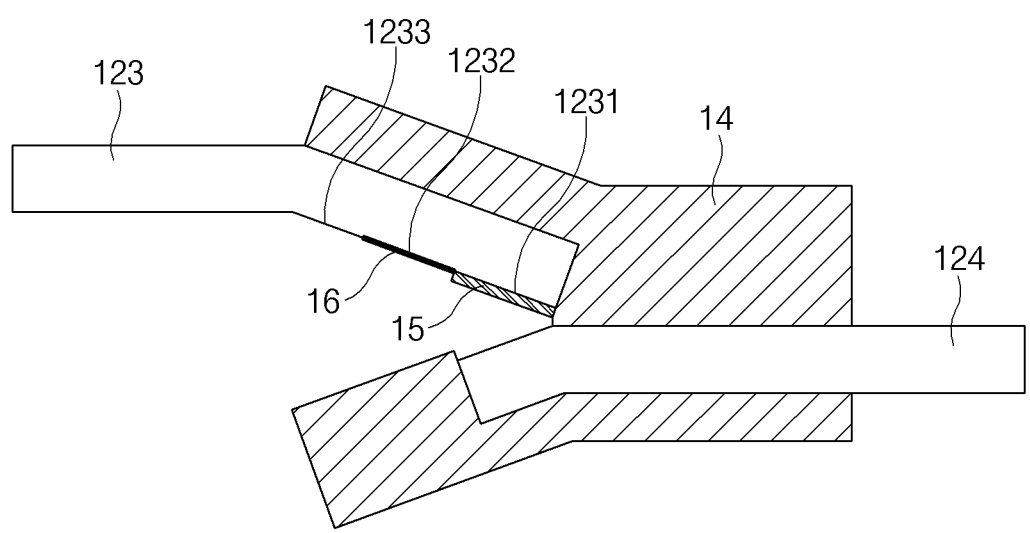
FIG. 10 is an enlarged view of the first electrode lead, the second electrode lead, and the connection part of FIG. 8 according to an embodiment of the present invention.

FIG. 9 is an enlarged view of the first electrode lead 123, the second electrode lead 124, and the connection part 15 of FIG. 7 according to an embodiment of the present invention, and FIG. 10 is an enlarged view of the first electrode lead 123, the second electrode lead 124, and the connection part 15 of FIG. 8 according to an embodiment of the present invention.

As illustrated in FIG. 9, the pouch type secondary battery 1 according to an embodiment of the present invention may further include a fusion prevention part 16. As described above, the insulation part 14 may be disposed to be limited within a sealing part at which the upper pouch 131 and the lower pouch 132 of the battery case 13 are thermally fused. Also, when the sealing part is seated, the insulation part 14 may be thermally fused together and thus be attached to the first electrode lead 123 and the second electrode lead 124. Here, the fusion prevention part 16 may be disposed at a specific position on one surface of the first electrode lead to prevent the first electrode lead 123 and the insulation part 14 from being fused to each other. Thus, when the battery case 13 is expanded, and thus, the first electrode lead 123 and the second electrode lead 124 are detached from each other, as illustrated in FIG. 10, one surface of the first electrode lead 123 and the insulation part 14 may be detached from each other by the fusion prevention part 16. Here, the fusion prevention part 16 may be adjusted in length L to control the internal pressure of the battery case 13 in which the first and second electrode leads 123 and 124 are detached from each other.

According to an embodiment of the present invention, the fusion prevention part 16 may not be provided as a separate member but be defined as a specific position of one surface of the first electrode lead 123. Here, the one surface of the first electrode lead 123 among several surfaces of the first electrode lead 123 may be a surface facing the connection part 15 and the second electrode lead 124.

The one surface of the first electrode lead 123 includes a first position 1231 to which the connection part 15 is attached, a second position 1232 disposed from the first position 1231 toward the inside of the battery case 13, and a third position 1233 disposed from the second position 1232 toward the inside of the battery case 13. That is, as illustrated in FIG. 9, the first to third positions 1231 to 1233 may be disposed in parallel to the one surface. Also, it is preferable that the fusion prevention part 16 is disposed at the second position 1232, and the insulation part 14 is attached to the third position 1233. However, the present invention is not limited thereto. For example, the fusion prevention part may be disposed at the third position 1233, and the insulation part 14 may be attached to the second position 1232. Thus, the fusion prevention part 16 may be disposed on the same surface as the surface of the first electrode lead 123 to which the connection part 15 is attached and also disposed from one side of the connection part 15 toward the inside of the battery case 13.

The fusion prevention part 16 prevent the first electrode lead 123 and the insulation part 24 from being fused to each other. Particularly, the bonding force between the second position 1232 of the first electrode lead 123 or the insulation part 14 and the fusion prevention part 16 may be less than that between the third position of the first electrode lead 123 and the insulation part 14. This is done because surface treatment is also performed on the third position 1233 of the first electrode lead 123, and the insulation part 14 is acid-treated. However, when the battery case 13 is expanded, the detachment between the second position 1232 of the first electrode lead 123 or the insulation part 14 and the fusion prevention part 16 and the detachment between the third position 1233 of the first electrode lead 123 and the insulation part 14 may occur almost at the same time.

Also, the bonding force between a third position 1233 of the first electrode lead 123 and the insulation part 14 may be less than that between the first or second electrode lead 123 or 124 and the connection part 15. Thus, when the battery case 13 is expanded, the third position of the first electrode lead 123 and the insulation part 14 may be detached first from each other, and then the first or second electrode lead 123 or 124 and the connection part 15 may be detached relatively later from each other.

Also, as described above, the bonding force between the first or second electrode lead 123 or 124 and the connection part 15 may be less than that between the other surface of the first electrode lead 123 and the insulation part 14 or between the second electrode lead 124 and the insulation part 14. Thus, when the battery case 13 is expanded, the bonding force between the other surface of the first electrode lead 123 or the second electrode lead 124 and the insulation part may be maintained to maintain the sealing of the battery case 13.

That is, the bonding force may gradually decrease in order of the bonding force between the other surface of the first electrode lead 123 and the insulation part 14, the bonding force between the first or second electrode lead 123 or 124 and the connection part 15, the bonding force between the third position 1233 of the first electrode lead 123 and the insulation part 14, and the bonding force between the second position 1232 of the first electrode lead 123 or the insulation part 14 and the fusion prevention part 16. Thus, when the battery case 13 is expanded, the detachment between the second position 1232 of the first electrode lead 123 or the insulation part 14 and the fusion prevention part 16 and the detachment between the third position 1233 of the first electrode lead 123 and the insulation part 14 may occur almost at the same time. Also, finally, the first and second electrode leads 123 and 124 may be detached from each other while the first position 1231 of the first electrode lead 123 and the connection part 15 are detached from each other.

Here, the fusion prevention part 16 may be adjusted in length L to control the internal pressure of the battery case in which the first and second electrode leads 123 and 124 are detached from each other. For example, when the length L of the fusion prevention part 16 is relatively short, an area between the third position 1233 of the first electrode lead 123 and the insulation part 14 may increase to allow the bonding force to increase. Thus, the internal pressure of the battery case 13 in which the first and second electrode leads 123 and 124 are detached from each other may increase. On the other hand, when the length L of the fusion prevention part 16 is relatively long, the area between the third position 1233 of the first electrode lead 123 and the insulation part 14 may decrease to allow the bonding force to decrease. Thus, the internal pressure of the battery case 13 in which the first and second electrode leads 123 and 124 are detached from each other may decrease. Also, in the secondary batteries 1 having the same specifications and model, the internal pressure of the battery case 13 in which the first and second electrode leads 123 and 124 are detached from each other may be always constantly controlled. It is preferable that the length L is 1 mm to 4 mm, but is not limited thereto. For example, the length L may variously vary.

In order to form the fusion prevention part 16, bonding force between one surface of the first electrode lead 123 and the insulation part 14 has to be significantly reduced or removed. However, in order to generally attach the electrode lead 123 to the insulation part 14, surface treatment has to be performed on a surface of a metal forming the electrode lead 123, and the insulation part 14 has to be acid-treated. Thus, in order to form the fusion prevention part 16, at least one condition of the above-described two conditions has to be removed. Hereinafter, various embodiments for forming the fusion prevention part 16 will be described.

As described above, according to an embodiment of the present invention, the fusion prevention part 16 is not provided as a separate member. For this, when the first electrode lead 123 is manufactured, the metal may be surface-treated, and then, the second position 1232 may be polished using an abrasive such as sandpaper or a grinding device such as a grinder.

Particularly, the electrode lead 12 is made of a metal material. That is, as described above, the positive electrode lead 121 may be made of the same material as the positive current collector, i.e., an aluminum (Al) material, and the negative electrode lead 122 may be made of the same material as the negative current collector, i.e., a copper (Cu) material or a copper material coated with nickel (Ni). However, the present invention is not limited thereto. For example, the positive electrode lead 121 and the negative electrode lead 122 may be made of materials different from those of the positive current collector and the negative current collector, respectively. Furthermore, the electrode lead 12 may be made of various materials such as copper (Cu), aluminum (Al), nickel (Ni), iron (Fe), carbon (C), chromium (Cr), manganese, and the like as long as the electrode lead 12 electrically connects the electrode tab 11 to an external terminal.

When the surface treatment is performed on the metal, a surface-treated layer is formed. Since the surface-treated layer has hydrophilicity, the electrode lead 12 and the insulation part 14 may be easily attached. That is, the bonding force between the surface-treated layer and the insulation part 14 is superior. However, the bonding force acts as resisting force when the first and second electrode leads 123 and 124 are detached from each other. Thus, the more the bonding force between the electrode lead 12 and the insulation part 14 increases, the more the internal pressure of the battery case 13, in which the first and second electrode leads 123 and 124 are detached from each other, increases.

Also, when the surface-treated layer is formed, the surface-treated layer is thermally fused to the sealant layer 23 of the battery case 13 to prevent defects such as corrosion or delamination from occurring by internal and external stimulations of the secondary battery 1. Also, since physical and chemical properties of the surface-treated layer are different according to a method for performing the surface treatment on the metal, performance such as the bonding strength with the insulation part 14 and electrolytic solution resistance may be different.

Like this, in order to perform the surface treatment of the electrode lead 12, chromium (Cr) may be used generally. When a film is formed on the surface of the metal by using the chromium, the bonding strength with the insulation part 14 and the electrolytic solution resistance may be superior. However, chromium is harmful to the human body and the environments, its use is restricted due to the restriction of RoHS. Thus, in recent years, polymethylmethacrylate (PMMA) or polyacrylamide may be used instead of chromium, or a plasma treatment method in which plasma discharge is generated by a gas such as oxygen ($O_2$), ammonia ($NH_3$), or argon (Ar) has been proposed. However, the present invention is not limited thereto. For example, various methods may be used so long as the electrode lead 12 is surface-treated.

According to an embodiment of the present invention, the surface treatment may be performed on the electrode lead 12 to form the surface-treated layer, and then, the second position 1232 on one surface of the electrode lead 123 may be polished using an abrasive such as sandpaper or a grinding device such as a grinder. Like this, when the surface-treated layer is polished and removed at the second position 1232, the fusion prevention part 16 may be formed, and the bonding force with the insulation part 14 may be weakened even in the thermal fusion.

In addition to the method for polishing the second position 1232, other methods may be used. According to a modified example of an embodiment of the present invention, a taping process for attaching a first tape to the second position 1232 of the first electrode lead 123 may be performed. Then, when the above-described surface treatment is performed, the surface-treated layer is formed on positions remaining except for the second position 1232 of the first electrode lead 123. Also, when the attached first tape is delaminated to be removed, the surface-treated layer may not be formed on only the second position 1232, and thus, the fusion prevention part 16 may be formed. Here, while surface treatment is performed, the first tape does not have to be corroded or deformed. Thus, it is preferable that the first tape is made of a material that is excellent in corrosion resistance and abrasion resistance.

Figure 11:
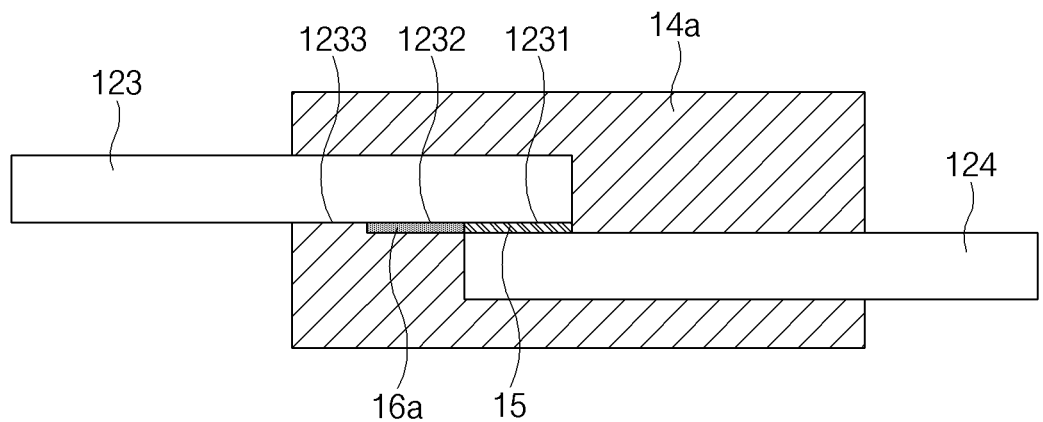
FIG. 11 is an enlarged view of a first electrode lead, a second electrode lead, and a connection part of FIG. 7 according to another embodiment of the present invention.

FIG. 11 is an enlarged view of a first electrode lead 123, a second electrode lead 124, and a connection part 15 of FIG. 7 according to another embodiment of the present invention.

The fusion prevention part 16 according to an embodiment of the present invention may not be provided as a separate member but be defined as a specific position of one surface of the first electrode lead 123. On the other hand, a fusion prevention part 16a according to another embodiment of the present invention may be provided as a separate member as illustrated in FIG. 11. Hereinafter, the fusion prevention part 16a according to another embodiment of the present invention will be described. However, descriptions duplicated with those of the fusion prevention part 16 according to the foregoing embodiment of the present invention will be omitted.

The fusion prevention part 16a according to another embodiment of the present invention may be formed at a second position 1232 of a first electrode lead 123. For this, when the first surface lead 123 is manufactured, after the surface treatment is performed, a taping process of attaching a second tape to the second position 1232 of the first electrode lead 123 may be performed. Thereafter, the first electrode lead 123 and a second electrode 124 are connected to each other by using a connection part 15, and an insulation part 14a surrounding the first and second electrode leads 123 and 124 are fused. Then, as illustrated in FIG. 11, the attached second tape may be provided as the fusion prevention part 16a according to another embodiment of the present invention. It is preferable that the fusion prevention part 16a has a very thin thickness, for example, about 20 μm to about 50 μm.

As described above, the insulating part 14a may include a polyolefin-based resin such as polypropylene (PP) or polyethylene (PE), particularly, may include acid-treated polypropylene. Here, the acid-treated polypropylene may be maleic anhydride polypropylene (MAH PP). When thermal fusion is performed, the acid-treated polypropylene may be improved in bonding force and attached to the electrode lead 12. However, normal polypropylene that is not acid-treated may not be attached to the electrode lead 12 even through the thermal fusion is performed. The second tape that is the fusion prevention part 16a may not be delaminated, unlike the first tape. Thus, when the insulation part 14a is thermally fused, the second tape may be also thermally fused. Thus, it is preferable that the second tape is made of a polyolefin-based resin that is not acid-treated so that the second tape is not attached to the electrode lead 12 even though the thermal fusion is performed, particularly, normal polypropylene.

Figure 12:
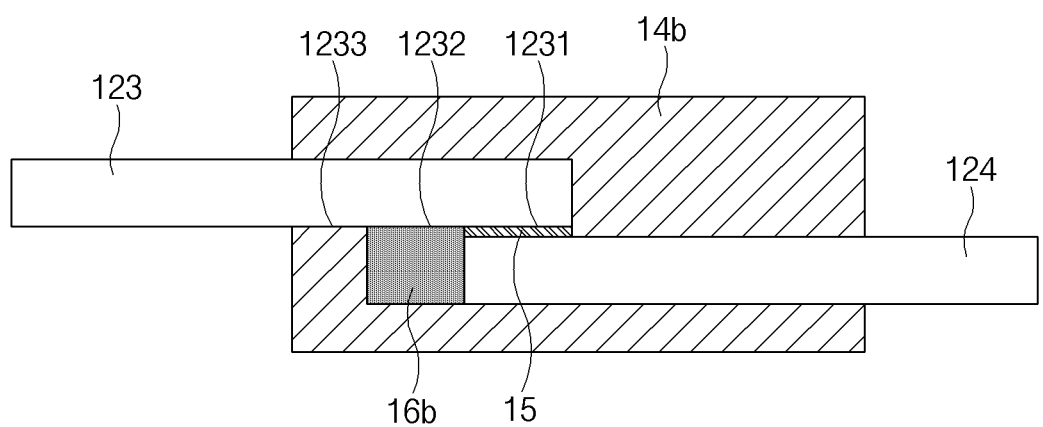
FIG. 12 is an enlarged view of a first electrode lead, a second electrode lead, and a connection part of FIG. 7 according to further another embodiment of the present invention.

FIG. 12 is an enlarged view of a first electrode lead 123, a second electrode lead 124, and a connection part 15 of FIG. 7 according to further another embodiment of the present invention.

A fusion prevention part 16b according to further another embodiment of the present invention may be provided as a separate member like the fusion prevention part 16a according to another embodiment of the present invention. Hereinafter, the fusion prevention part 16b according to further another embodiment of the present invention will be described. However, descriptions of the fusion prevention part 16b, which are duplicated with those of the fusion prevention part 16a according to the foregoing embodiment of the present invention, will be omitted.

The above-described fusion prevention part 16b according to further another embodiment of the present invention may be formed by attaching a second tape to a second position 1232 of a first electrode lead 123. On the other hand, the fusion prevention part 16b according to further another embodiment of the present invention may not be attached to the first electrode lead 123 but be attached to a specific position of the insulation part 14b. Here, the specific position of the insulation part 14b may be a position corresponding to the second position 1232 of the first electrode lead 123. That is, the specific position may represent a position at which, when the fusion prevention part 16b is attached to the insulation part 14b to fuse the insulation part 14b, the fusion prevention part 16b contacts the second position 1232 of the first electrode lead 123.

Also, since the fusion prevention part 16b is not delaminated after being attached, the fusion prevention part 16b may be fused together when the insulation part 14b is thermally fused. Thus, it is preferable that the fusion prevention part 16b is made of a polyolefin-based resin that is not acid-treated so that the second tape is not attached to the electrode lead 12 even though the thermal fusion is performed, particularly, normal polypropylene. However, since the fusion prevention part 16b has a film shape, the fusion prevention part 16b may have a thickness greater than that of the fusion prevention part 16a according to another embodiment of the present invention, for example, a thickness of about 50 μm to about 200 μm.

However, the present invention is not limited thereto. For example, the fusion prevention part 16b may not be provided as a separate member, and a portion of the insulation part 14, which is not acid-treated, may function as the fusion prevention part 16b as long as only a portion of the insulation part 14 is not acid-treated when polypropylene is acid-treated to manufacture the insulation part 14.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A pouch type secondary battery comprising:
an electrode assembly in which a positive electrode and a negative electrode and a separator are alternately laminated;
a battery case accommodating the electrode assembly in an inside thereof;
an electrode tab connected to the electrode assembly and protruding from one side of the electrode assembly;
a first electrode lead having an inner end electrically connected to the electrode tab;
a second electrode lead having an inner end mechanically and electrically coupled to an outer end of the first electrode lead and an outer end extending from the inside to an outside of the battery case in a first direction;
a connection part mechanically and electrically coupling a first part of a first surface of the first electrode lead and a first surface of the second electrode lead to each other;
an insulation part fused around a first portion of each of the first and second electrode leads, the insulation part bonding the first portion of each of the first and second electrode leads to the battery case; and
a fusion prevention part located at a second portion of the first electrode lead, the second portion being a second part of the first surface of first electrode lead that does not extend between the first and second electrode leads, the fusion prevention part preventing the second portion of the first electrode lead from being fused to the insulation part,
wherein the fusion prevention part is entirely disposed within the insulation part,
wherein the fusion prevention part has a length of 1-4 mm extending in the first direction, the fusion prevention part being configured to reduce an adhesion area between the first electrode lead and the insulation part, thereby decreasing a minimum internal pressure of the battery case at which the first and second electrode leads detach from each other.

2. The pouch type secondary battery of claim 1, wherein the fusion prevention part is located between the connection part and the inside of the battery case.

3. The pouch type secondary battery of claim 1, wherein the fusion prevention part is an abraded portion of the first surface of the first electrode lead.

4. The pouch type secondary battery of claim 1, wherein the fusion prevention part is a non-surface-treated portion of the first surface of the first electrode lead.

5. The pouch type secondary battery of claim 4, wherein a remaining portion of the first surface of the first electrode lead is surface-treated.

6. The pouch type secondary battery of claim 1, wherein the insulation part comprises an acid-treated polyolefin-based resin.

7. The pouch type secondary battery of claim 6, wherein the polyolefin-based resin comprises polypropylene.

8. The pouch type secondary battery of claim 1, wherein the fusion prevention part is a tape attached to the second portion of the first surface of the first electrode lead.

9. The pouch type secondary battery of claim 8, wherein the tape comprises normal polypropylene that is not acid-treated.

10. The pouch type secondary battery of claim 1, wherein the fusion prevention part is a film attached to the insulation part, the film contacting the second portion of the first surface of the first electrode lead.

11. The pouch type secondary battery of claim 10, wherein the film comprises normal polypropylene that is not acid-treated.

12. The pouch type secondary battery of claim 1, wherein a bonding force between the fusion prevention part and a confronting surface of the first electrode lead or the insulation part is less than a bonding force between the first or second electrode lead and the connection part.

13. The pouch type secondary battery of claim 1, wherein the connection part is made of a conductive polymer comprising an electrically conductive material.

14. The pouch type secondary battery of claim 1, wherein the connection part has a thickness of 1 μm to 500 μm.

15. The pouch type secondary battery of claim 1, wherein the insulation part surrounds a location at which the first and second electrode leads are connected to each other by the connection part.

* * * * *